US008194670B2

(12) United States Patent
Tripathi et al.

(10) Patent No.: US 8,194,670 B2
(45) Date of Patent: Jun. 5, 2012

(54) UPPER LAYER BASED DYNAMIC HARDWARE TRANSMIT DESCRIPTOR RECLAIMING

(75) Inventors: Sunay Tripathi, Palo Alto, CA (US); Rajagopal Kunhappan, Fremont, CA (US); Nicolas G. Droux, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 218 days.

(21) Appl. No.: 12/495,386

(22) Filed: Jun. 30, 2009

(65) Prior Publication Data

US 2010/0329259 A1    Dec. 30, 2010

(51) Int. Cl.
    *H04L 12/28* (2006.01)
(52) U.S. Cl. ........ 370/392; 709/213; 709/238; 709/250; 719/312
(58) Field of Classification Search ........................ None
    See application file for complete search history.

(56) References Cited

U.S. PATENT DOCUMENTS

| | | | |
|---|---|---|---|
| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,146,431 B2 | 12/2006 | Hipp et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2002/0052972 A1 | 5/2002 | Yim |
| 2003/0037154 A1 | 2/2003 | Poggio et al. |
| 2004/0177164 A1* | 9/2004 | DiMambro et al. .......... 709/250 |
| 2005/0135243 A1 | 6/2005 | Lee et al. |
| 2005/0138620 A1 | 6/2005 | Lewites |
| 2006/0041667 A1 | 2/2006 | Ahn et al. |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Ayaz Sheikh
*Assistant Examiner* — Nicholas Sloms
(74) *Attorney, Agent, or Firm* — Osha • Liang LLP

(57) ABSTRACT

In general, the invention relates to reclaiming transmit descriptors by configuring a media access control (MAC) to execute a first MAC layer thread to reclaim a first number of transmit descriptors (TDs) from a first hardware transmit ring (HTR) using a first reclaim algorithm, where the first reclaim algorithm is associated with a first transmission pattern and a first TDR status. The invention further includes receiving, by a virtual NIC (VNIC) executing within the MAC layer, a first number of packets, forwarding the first number of packets to a device driver on the host associated with the physical NIC, and forwarding the first number of packets from the device driver to the physical NIC using the first number of TDs, where the first plurality of TDs are reclaimed by the first MAC layer thread according to the first reclaim algorithm.

14 Claims, 9 Drawing Sheets

U.S. PATENT DOCUMENTS

| | | |
|---|---|---|
| 2006/0070066 A1 | 3/2006 | Grobman |
| 2006/0174324 A1 | 8/2006 | Zur et al. |
| 2007/0016694 A1* | 1/2007 | Achler .................... 709/247 |
| 2010/0128605 A1* | 5/2010 | Chavan et al. ............. 370/230.1 |

OTHER PUBLICATIONS

Tripathi, S.; "Crossbow: Network Virtualization and Resource Control"; Presentation to Sun Labs Open House; Jun. 1, 2006; (22 pages).

Belgaied, K. et al.; "Crossbow Hardware Resources Management and Virtualization"; Sep. 28, 2007; 14 pages.

Droux, N.; "Crossbow Network Virtualization Architecture"; Aug. 28, 2007; Solaris Core OS, Sun Microsystems, Inc.; 51 pages.

Khare, S.; "VLANs as VNICs"; Solaris Networking, Sun Microsystems, Inc.; Aug. 13, 2007; 9 pages.

Droux, N.; "Virtual Switching in Solaris"; Solaris Networking, Sun Microsystems, Inc.; Apr. 2, 2007; 6 pages.

Tripathi, S.; "Crossbow Architectural Document"; Nov. 21, 2006; 19 pages.

Nordmark, E., et al.; "IP Instances Interface Document"; PSARC 2006/366; Dec. 28, 2006; 18 pages.

Nordmark, E.; "IP Instances Design Document"; PSARC 2006/366; Dec. 21, 2006; 38 pages.

Droux, N.; "Crossbow: Network Virtualization and Bandwidth Partitioning"; presented at CHOSUG, Jun. 19, 2007; 23 pages.

Nordmark; E.; "IP Instances—Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

Tripathi, S.; "NIC/VNIC/Flows—Bandwidth Control & Fanout", Feb. 24, 2007; (7 Pages).

* cited by examiner

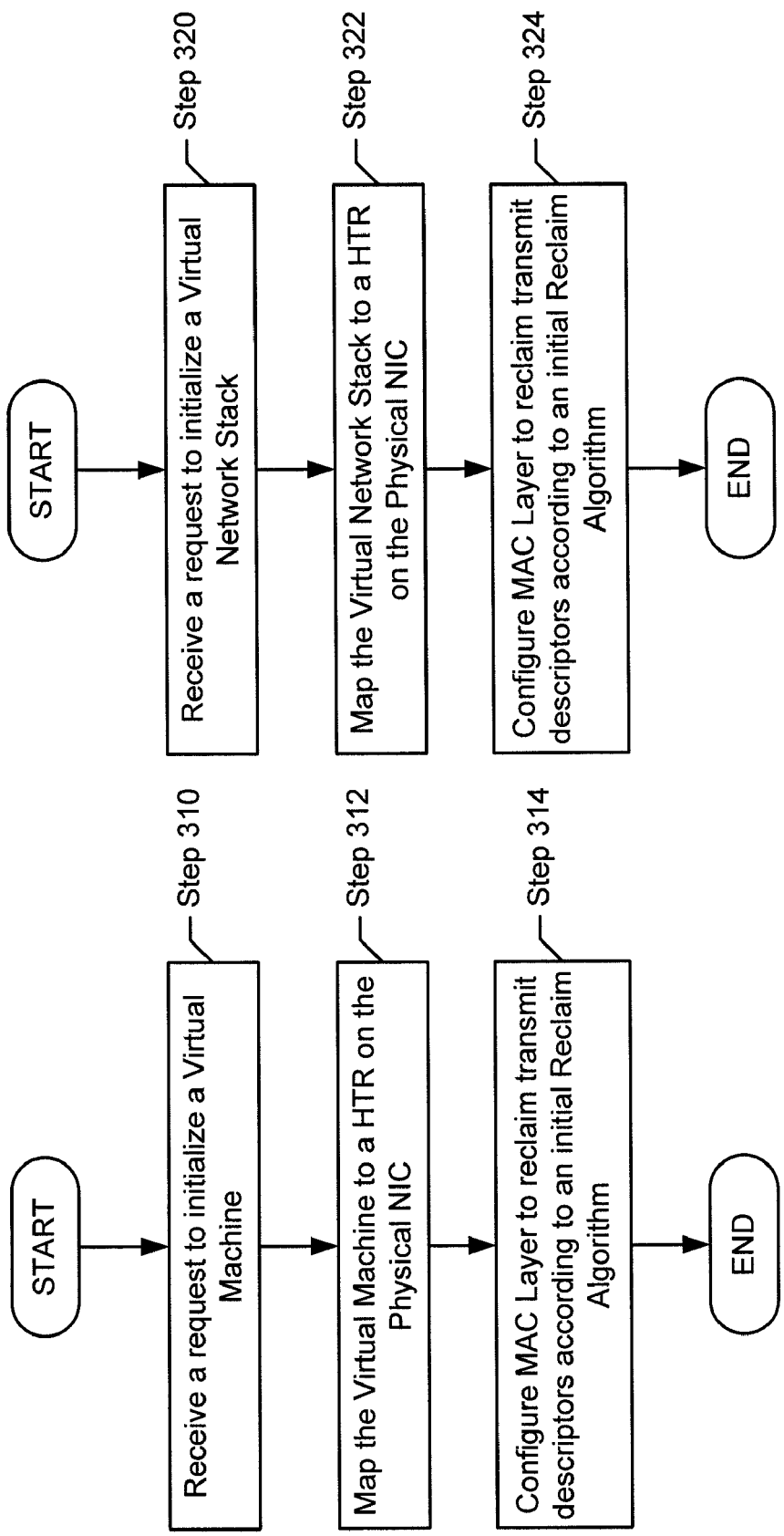

UPPER LAYER BASED DYNAMIC HARDWARE TRANSMIT DESCRIPTOR RECLAIMING

BACKGROUND

Network traffic (typically in the form of packets) is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic, typically in the form of packets.

In order to transmit data via the NIC, the computer system may need to transfer the traffic to memory located on the NIC. Descriptions of the memory locations are referred to as memory descriptors. A computer system must obtain a description of the location of available NIC memory in order to successfully transfer the data to the NIC.

SUMMARY

In general, in one aspect, the invention relates to a computer readable medium comprising software instructions for reclaiming transmit descriptors, wherein the software instructions, when executed, perform a method, the method comprising configuring a media access control (MAC) to execute a first MAC layer thread to reclaim a first plurality of transmit descriptors (TDs) from a first hardware transmit ring (HTR) using a first reclaim algorithm, wherein the first HTR comprises a transmit descriptor ring (TDR) and resides on a physical network interface card (NIC), wherein the first MAC layer thread is executing on a host operatively connected to the physical NIC, and wherein the first reclaim algorithm is associated with a first transmission pattern and a first TDR status, receiving, by a virtual NIC (VNIC) executing within the MAC layer, a first plurality of packets, forwarding the first plurality of packets to a device driver on the host associated with the physical NIC, and forwarding the first plurality of packets from the device driver to the physical NIC using the first plurality of TDs, wherein the first plurality of TDs are reclaimed by the first MAC layer thread according to the first reclaim algorithm.

In general, in one aspect, the invention relates to a system comprising: a physical network interface card (NIC) comprising a plurality of hardware transmit rings (HTR), wherein at least one of the plurality of HTRs comprise a transmit descriptor ring (TDR); and a host, operatively connected to the physical NIC, comprising a host operating system (OS), wherein the host OS comprises: a device driver associated with the physical NIC; a media access control (MAC) layer configured to reclaim a plurality of transmit descriptors (TDs) from a first one of the plurality of HTRs using a first reclaim algorithm, wherein the first reclaim algorithm is associated with a first transmission pattern and a first TDR status; and a plurality of virtual NICs (VNIC), executing within the MAC layer, configured to receive a plurality of packets from a packet source, wherein packets received by the plurality of VNICs are forwarded via the device driver to the physical NIC using at least one of the plurality of TDs reclaimed by the MAC layer.

BRIEF DESCRIPTION OF DRAWINGS

FIG. 3A shows a flowchart in accordance with one or more embodiments of the invention.

FIG. 3B shows a flowchart in accordance with one or more embodiments of the invention.

DETAILED DESCRIPTION

Figure 1A:
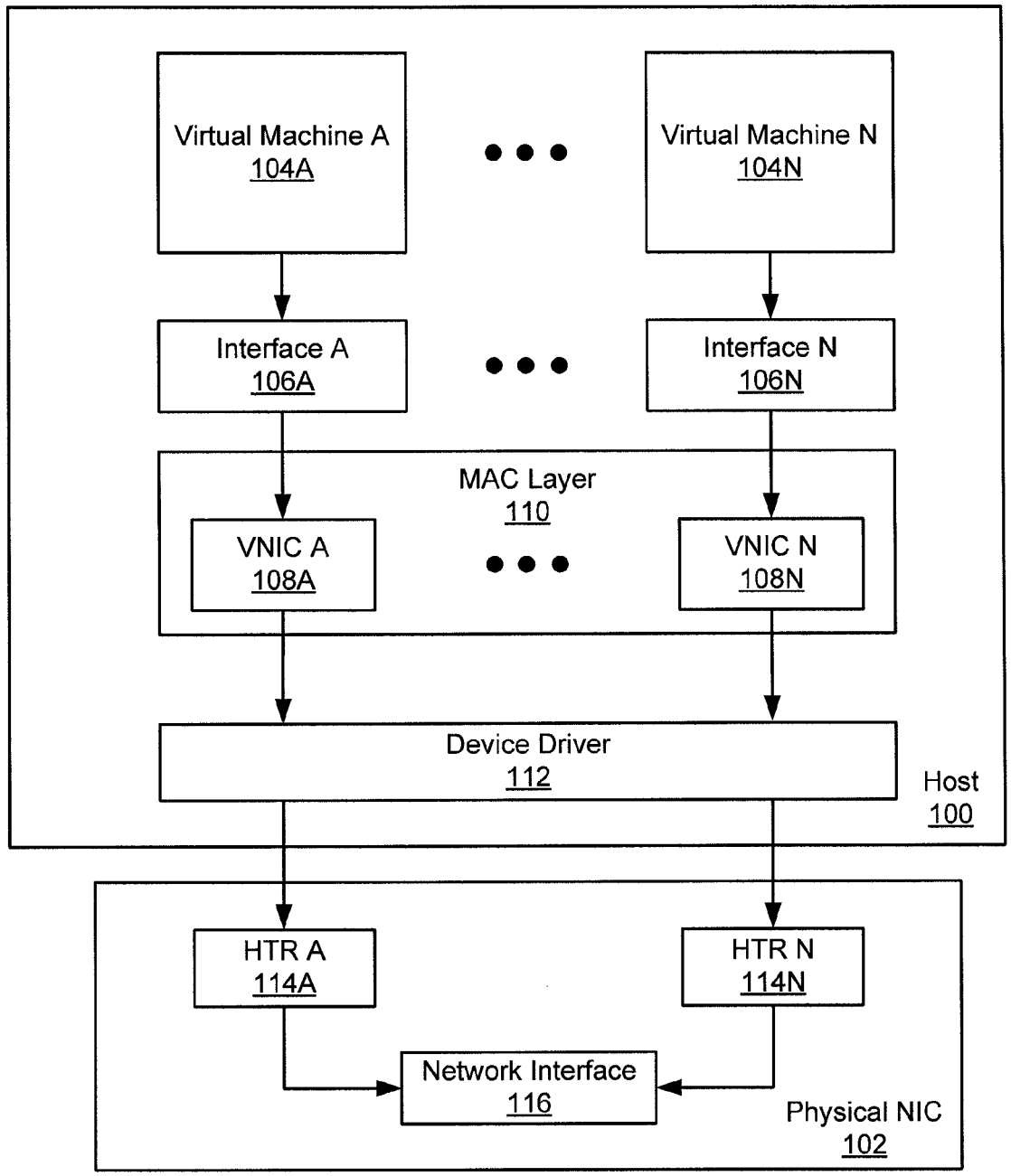
FIG. 1A shows a system in accordance with one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to reclaiming transmit descriptors from network hardware. Specifically, embodiments of the invention may relate to dynamically reclaiming hardware transmit descriptors using elements within the media access control (MAC) layer of a host.

FIG. 1A shows a system in accordance with one embodiment of the invention. As shown in FIG. 1A, the system includes a host (100) operatively connected to a physical network interface card (NIC) (102). The host includes one or more virtual machines (VMs) (104A, 104N). In one embodiment of the invention, the host OS (not shown) is configured to provide functionality to create virtual execution environments (e.g., virtual machines) (104A, 104N). Further, the host OS may include functionality to manage the aforementioned virtual environments. The virtual environments may be provided using well known techniques in the art. An example of virtual execution environment is a Solaris™ Container. In such cases, the Solaris™ Container may execute in the host OS, which may be a Solaris™ OS. Solaris™ is a trademark of Sun Microsystems, Inc. Those skilled in the art will appreciate that other virtualization technologies such as VMware® Server (VMware® a registered trademark of VMware, Inc.) and Xen® (Xen® is a trademark overseen by the Xen Project Advisory Board) may also be used to provide virtual execution environments.

In one embodiment of the invention, each virtual execution environment includes functionality to execute an operating system (i.e., a guest OS). Further, each virtual execution environment may be isolated such that processes within a virtual execution environment may not communicate with other processes in other virtual execution environments. In addition, each virtual execution environment may be associated with a portion of the total hardware and processing resources of the host. In one embodiment of the invention, the host OS may include the functionality to send messages to, and receive messages from, elements within each of the virtual execution environments.

In one embodiment of the invention, the VMs (104A, 104N) transmit data in the form of datagrams or packets. Packets may include a payload and control data used to store information necessary for transmission. Packets are sent from the VMs (104A, 104N) to an interface (106A, 106N). The interface (106A, 106N) includes functionality to enable the VMs (104A, 104N) to communicate with the host (100) upon which they are executing. In one embodiment of the invention, packets are forwarded from the interface to a virtual NIC (VNIC) (108A, 108N). In one or more embodiments of the invention, each VNIC (108A, 108N) appears as a physical NICs to the associated VMs (104A, 104N). In one embodiment of the invention, the VNICs (108A, 108N) provide an abstraction layer between the VMs (104A, 104N) and the physical NIC (102). More specifically, each VNIC (108A, 108N) operates like a physical NIC (102). For example, in one embodiment of the invention, each VNIC (108A, 108N) is associated with one or more MAC addresses, one or more Internet Protocol (IP) addresses, one or more ports, and configured to handle one or more protocol types. Thus, while the host (100) may be operatively connected to a single physical NIC (102), VMs and other applications on the host (100) operate as if the host (100) is bound to multiple physical NICs. Said another way, each VNIC (108A, 108N) operates like a separate network device connected to the network. In one embodiment of the invention, each VNIC (108A, 108N) is located within the MAC layer (110) of the host (100). Further details regarding the MAC layer (110) are discussed in FIGS. 2A and 2B.

In one embodiment of the invention, packets are forwarded from the VNICs (108A, 108N) to the physical NIC (102) via a device driver (112). In one embodiment of the invention, the device driver (112) provides an interface between the host (100) and the hardware transmit rings (HTRs) (114A, 114N) on the physical NIC (102). More specifically, the device driver (112) exposes the HTRs (114A, 114N) to the host (100).

The physical NIC (102) provides an interface between the host (100) and a network (not shown) (e.g., a local area network, a wide area network, a wireless network, etc.). The physical NIC (102) includes one or more HTRs (114A, 114N) and a network interface (NI) (116). In one embodiment of the invention, the HTRs (114A, 114N) correspond to portions of memory within the physical NIC (102) used to temporarily store packets received from the host (100). The packets received by the HTRs (114A, 114N) are forwarded to the NI (116) for transmission on the network (not shown). In one embodiment of the invention, the NI (116) may be implemented as hardware on the physical NIC (102) used to interface with the network. In one embodiment of the invention, the NI (116) may correspond to an RJ-45 connector or a wireless antenna.

Figure 1B:
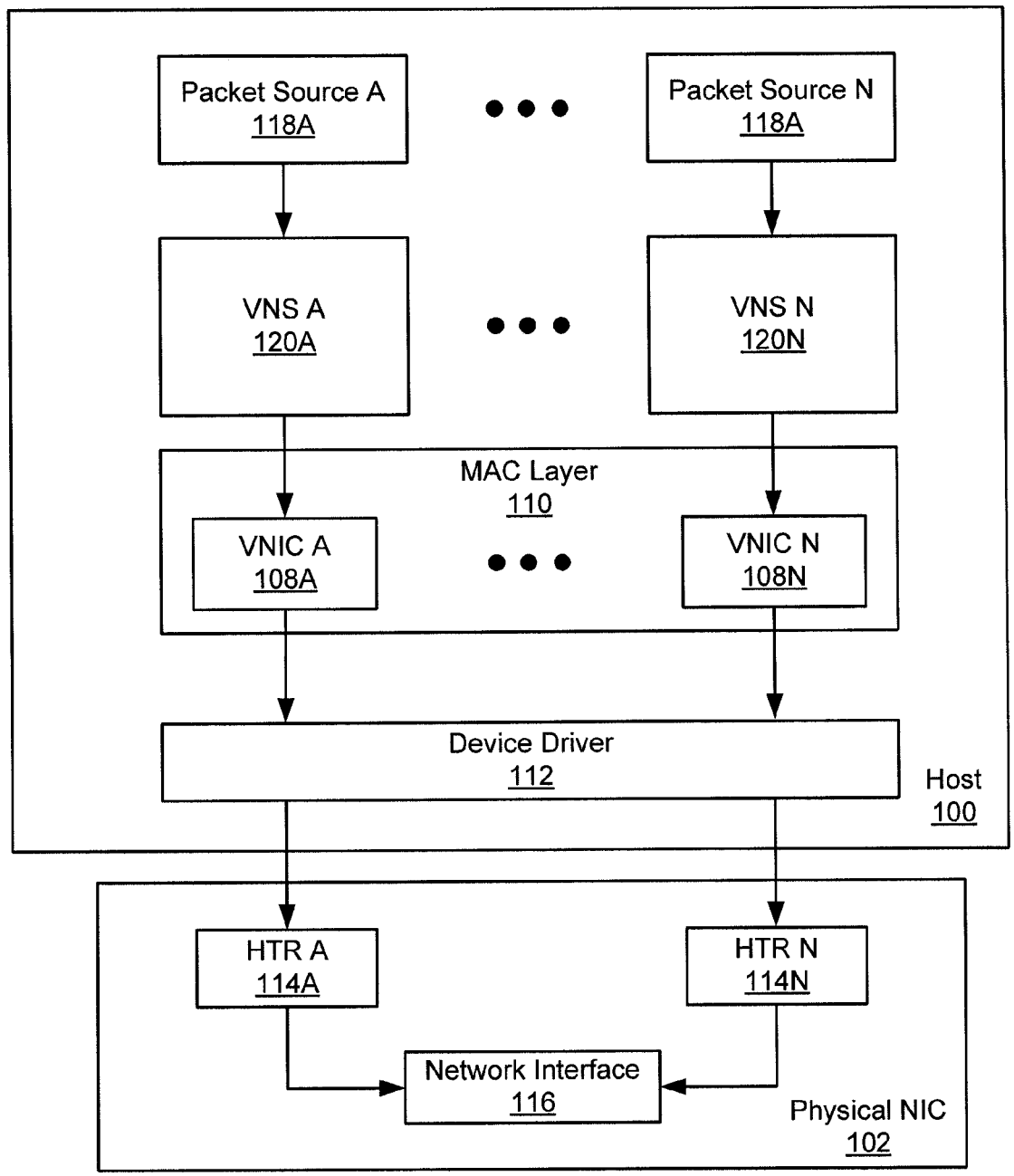
FIG. 1B shows a system in accordance with one or more embodiments of the invention.

FIG. 1B shows a system in accordance with one embodiment of the invention. The system depicted in FIG. 1B contains many of the same elements as those discussed in FIG. 1A. As shown in FIG. 1B, packets are sent initially by a packet source (e.g., Packet Source A (118A), Packet Source N (118N)). Packets sent from a packet source (118A, 118N) are received by a virtual network stack (VNS) (e.g., VNS A (120A), VNS N (120N)).

In one embodiment of the invention, each VNS (120A, 120N) includes functionality to process packets in accordance with various protocols used to send and receive packets (e.g., Transmission Communication Protocol (TCP), Internet Protocol (IP), User Datagram Protocol (UDP), etc.). Each VNS (120A, 120N) may also include functionality to send and receive packets from an associated VNIC (108A, 108N). Further, each VNS (120A, 120N) may also include functionality to send and receive packets from one or more associated packet sources (118A, 118N).

In one embodiment of the invention, each VNS (120A, 120N) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

Figure 2A:
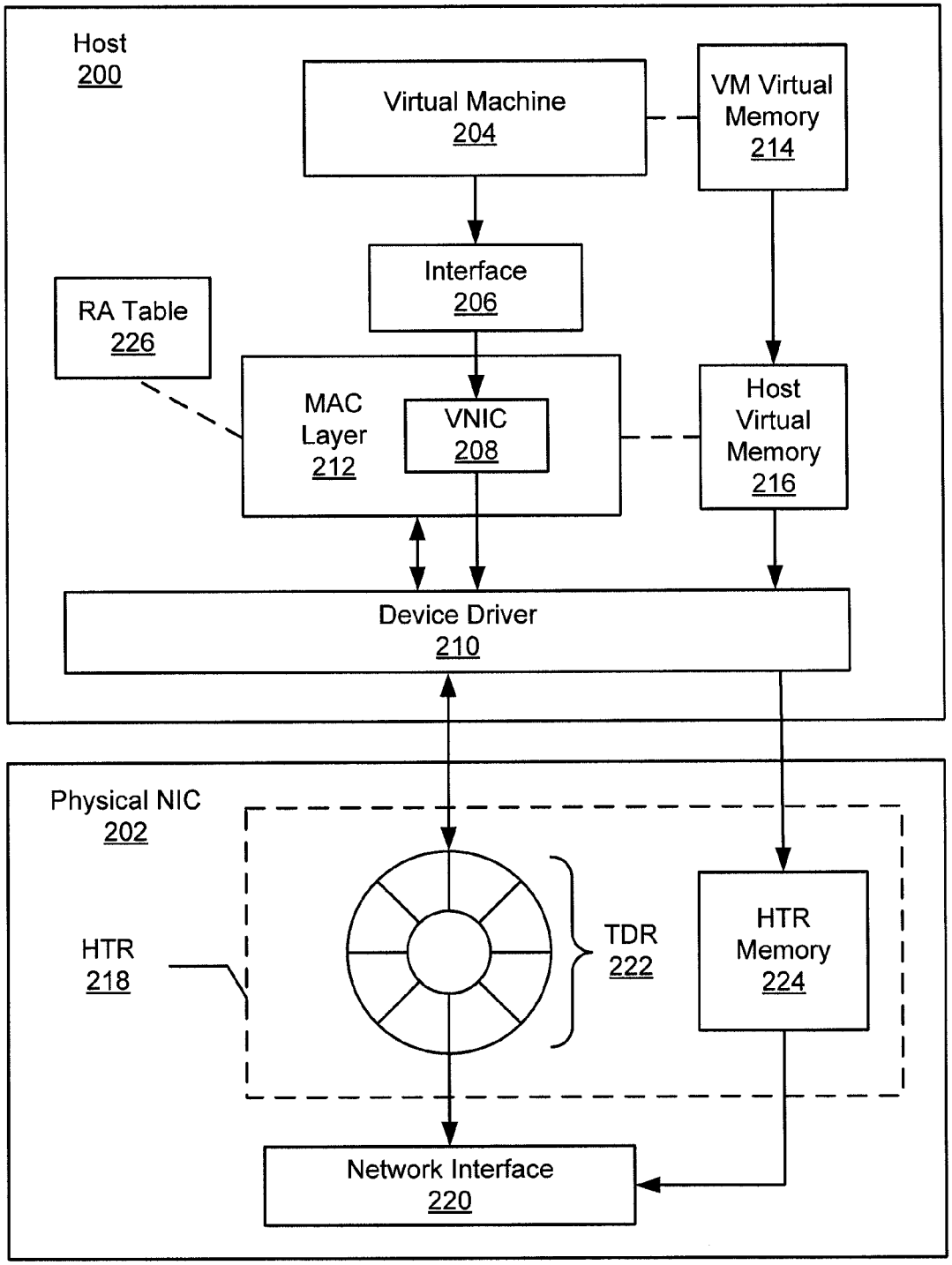
FIG. 2A shows a system in accordance with one or more embodiments of the invention.

FIG. 2A shows a system in accordance with one embodiment of the invention. The system depicted in FIG. 2A includes further details regarding some elements involved in one or more embodiments of the invention. FIG. 2A depicts a host (200) operatively connected to a physical NIC (202). The host (200) includes a VM (204), an interface (206), a VNIC (208), and a device driver (210). The VNIC is located within the MAC layer (212) of the host. The VM is associated with VM virtual memory (214), and the MAC layer of the host is associated with host virtual memory (216).

In one embodiment of the invention, the VM (204) is associated with VM virtual memory (214). VM virtual memory corresponds to a portion of memory resources on the host (200) that have been allocated for use by the VM (204). The VM virtual memory (214) may be used by the VM (204) to store packets for transmission. In one embodiment of the invention, in order to transmit packets to the network, outgoing packets must first be transferred to host virtual memory (216). The host virtual memory corresponds to a portion of memory resources on the host allocated for use by the host OS (not shown) and layers below the VM (204). In one embodiment of the invention, host virtual memory (216) and VM virtual memory (214) may be allocated from the same underlying physical memory (though not necessarily contiguous physical memory locations).

In one embodiment of the invention, the VM (204) may request, from the VNIC (208), an available location in host virtual memory (216) to which an outgoing packet or set of packets may be transferred. Once the VM (204) receives a description of the available location in host virtual memory (216), the outgoing packet is transferred to that location. In one embodiment of the invention, the VM (204) forwards the location in host virtual memory (216) of outgoing packets to the VNIC (208) via the interface (206).

In one embodiment of the invention, the physical NIC (202) includes an HTR (218) and a network interface (220). The HTR (218) includes a transmit descriptor ring (TDR) (222) and a HTR memory (224). In one embodiment of the invention, the TDR (222) is a buffer configured to store transmit descriptors (TDs). The TDs specify the location of the packet to be sent. In one embodiment of the invention, the TDs may describe an Input/Output (I/O) mapped address, a virtual memory address, or a physical memory address on the host (200). In one embodiment of the invention, in order to transmit outgoing packets to the physical NIC (202), the device driver requests (or "reclaims") an available TD, which may be initialized or reinitialized to reference (e.g., via a pointer) the location of an outgoing packet or packets in the host (200) (e.g., packets stored in an Input/Output (I/O) mapped address(es) a virtual memory address(es), or a physical memory address(es) on the host (200)). The timing and method of reclaiming TD from the TDR (222) is referred to as a reclaim algorithm.

In one embodiment of the invention, the physical NIC (202) includes the functionality to inform the device driver (210) on the host (200) of the current status of the TDR (222). The TDR status may correspond to the size of the TDR (222) and the current number of available TDs within the TDR (222). The device driver (210) may then forward the TDR status to the MAC layer (212) of the host (200).

Continuing with the discussion of FIG. 2A, in one embodiment of the invention, the MAC layer (212) (or more specifically, a thread executing within the MAC layer (212)) may include the functionality to interact with the physical NIC (202), via the device driver (210), in order to reclaim TDs from the TDR (222). The MAC layer (212) may include functionality to determine the most efficient method of reclaiming the TDs from the physical NIC (202). The MAC layer (212) may reclaim TDs according to a reclaim algorithm. The reclaim algorithm may be set by default or determined using an RA table (226). In order to make a determination about which reclaim algorithm to use, the MAC layer may use information gathered from the VNIC (208) regarding the transmission pattern of packets received from the VM (204). In one embodiment of the invention, the packet transmission pattern may be associated with the rate at which packets are received by a VNIC, the distribution when packets are received over a period of time, the distribution of rates at which the packets are received (e.g., how long the rate at which packets were received was a rate 1 as compared to rate 2), or any combination thereof. Further, the transmission pattern may be generally categorized as high throughput traffic or high latency traffic.

In one embodiment of the invention, the MAC layer (212) queries the RA table (226) using the TDR status received from the device driver (210) and the transmission pattern collected from the VNIC (208). The RA table (226) may return to the MAC layer (212) the most efficient reclaim algorithm for the given TDR status and transmission pattern pair.

In one embodiment of the invention, examples of reclaim algorithms may include inline reclaim after transmit, inline reclaim before transmit, and worker-thread based reclaim. A MAC layer (212) implementing an inline reclaim after transmit algorithm may perform the TD reclaim operation after the transmission of a packet, but within the same thread. Such an algorithm may be appropriate for a transmission pattern associated with few packets being sent, and a TDR status indicating a relatively high number of available TD. A MAC layer (212) implementing an inline reclaim before transmit algorithm may perform the TD reclaim operation before the transmission of a packet, but within the same thread. A MAC layer (212) may only attempt to reclaim TDs necessary to transmit the current packet Such an algorithm may be appropriate at a point where the TDR status indicates a relatively low number of available TD.

In one embodiment of the invention, the MAC layer (212) may also instantiate a worker thread (pursuant to a worker-thread based reclaim algorithm) to handle the reclaim operation in a separate thread. The worker thread may be configured to reclaim TD when the TDR status reaches a predetermined threshold, or in anticipation of reaching a predetermined threshold.

In one embodiment of the invention, once a TD, or group of TDs, has been reclaimed, outgoing packets are transferred from the memory location described by the TD(s), to locations in HTR memory (224). This transfer may be accomplished using a direct memory access (DMA) engine (not shown) (or any other well known mechanisms in the art). The physical NIC (202) is then informed that an outgoing packet has been transferred to the HTR memory (224).

Figure 2B:
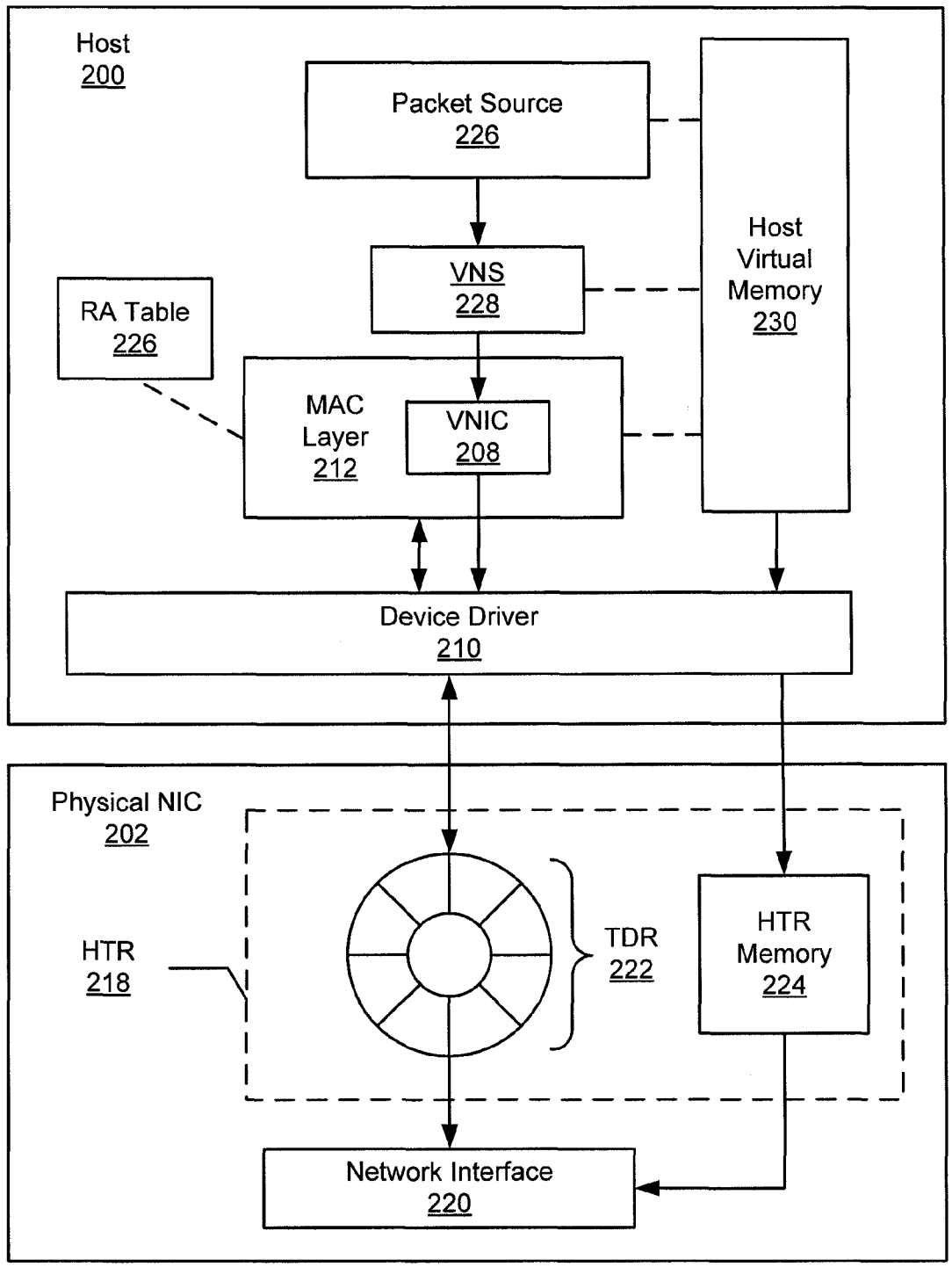
FIG. 2B shows a system in accordance with one or more embodiments of the invention.

FIG. 2B shows a system in accordance with one embodiment of the invention. The system depicted in FIG. 2B contains many of the same elements as those discussed in FIG. 2A. As shown in FIG. 2B, outgoing packets are sent from the packet source (226) to the VNIC (208) via a virtual network stack (VNS) (228). In one embodiment of the invention, the packet destination (226), VNS (228), and MAC layer (212) have access to the host virtual memory (230). Packets sent from the packet destination (226) and processed by the VNS (228) are stored in host virtual memory (230), and the description of the memory location is transferred to the VNIC (208). TDs, reclaimed by the MAC layer (212) and device driver (210), are used to transfer the outgoing packet from the host virtual memory to the HTR memory (224) on the physical NIC (202).

In one embodiment of the invention, and as depicted in FIGS. 1A and 1B, the MAC layer (212) may include multiple VNICs (e.g., 108A, 108N in FIGS. 1A and 1B). Accordingly, and referring back to FIGS. 2A and 2B, each VNIC (208) may be associated with one or more HTRs (218). In one embodiment of the invention, a different reclaim algorithm may be associated with each HTR (218) and implemented by the MAC layer (212). In one embodiment of the invention, the computing resources consumed by the worker thread reclaiming TDs from a HTR (218) may be assigned to the VM (204 in FIG. 2A) or packet source (226 in FIG. 2B) associated with the HTR. Said another way, the host OS (not shown) may record the computing resources consumed by the worker thread as having been used by the associated VM (204 in FIG. 2A) or packet source (226 in FIG. 2B).

In one embodiment of the invention, efficient is a relative term. Further, the efficiency of a given reclaim algorithm may be determined based on a historical data relating to the delay between packets being issued from the VM or VNS and being sent to NIC from the VNIC. The historical data may be maintained on a per-reclaim algorithm per-transmission pattern basis, per-reclaim algorithm per-transmission pattern per-VNIC basis, or any combination thereof. Accordingly, a given reclaim algorithm may be more efficient relative to another reclaim algorithm when the delay between packets being issued from the VM or VNS and being sent to NIC from the VNIC is less for on reclaim algorithm relative to the other.

FIG. 3A shows a flow chart for initializing a virtual machine in accordance with one or more embodiments of the invention. In one or more embodiments of the invention, one or more of the steps shown in FIG. 3A may be omitted, repeated, and/or performed in a different order than that shown in FIG. 3A. Accordingly, the specific arrangement of steps shown in FIG. 3A should not be construed as limiting the scope of the invention.

In Step 310, the host OS receives a request to initialize a virtual machine. In Step 312, the virtual machine is mapped to a HTR on the physical NIC. In Step 314, the MAC layer is configured to reclaim transmit descriptors from the physical NIC according to an initial reclaim algorithm. In one embodiment of the invention, the initial reclaim algorithm is the reclaim algorithm that is specified as the default reclaim algorithm.

FIG. 3B shows a flow chart for initializing a virtual network stack in accordance with one or more embodiments of the invention. In one or more embodiments of the invention, one or more of the steps shown in FIG. 3B may be omitted, repeated, and/or performed in a different order than that shown in FIG. 3B. Accordingly, the specific arrangement of steps shown in FIG. 3B should not be construed as limiting the scope of the invention.

In Step 320, the host OS receives a request to initialize a virtual network stack. In Step 322, the virtual network stack is mapped to a HTR on the physical NIC. In Step 324, the MAC layer is configured to reclaim transmit descriptors from the physical NIC according to an initial reclaim algorithm. In one embodiment of the invention, the initial reclaim algorithm is the reclaim algorithm that is specified as the default reclaim algorithm.

After the system (e.g., FIGS. 1A, 1B) using one or more of the method shown in FIGS. 3A, 3B above, the system may transmit packets to the network as follows: (i) packets created and stored in memory on host (e.g., packets stored in an Input/Output (I/O) mapped address(es) a virtual memory address(es), or a physical memory address(es) on the host (200)); (ii) TDs are obtained and initialized (or reinitialized) to reference the packets stored on the host; (iii) the TDs are used to transfer packets from the memory on the host to the memory on the NIC. For example, the TDs are used by a DMA engine (or another mechanism) on the host to transfer packets directly to the NIC. Alternatively, the NIC may receive the TDs from the host and then, using a DMA engine (or another mechanism) on the NIC and the TDs, transfer the packets to the NIC.

Figure 4:
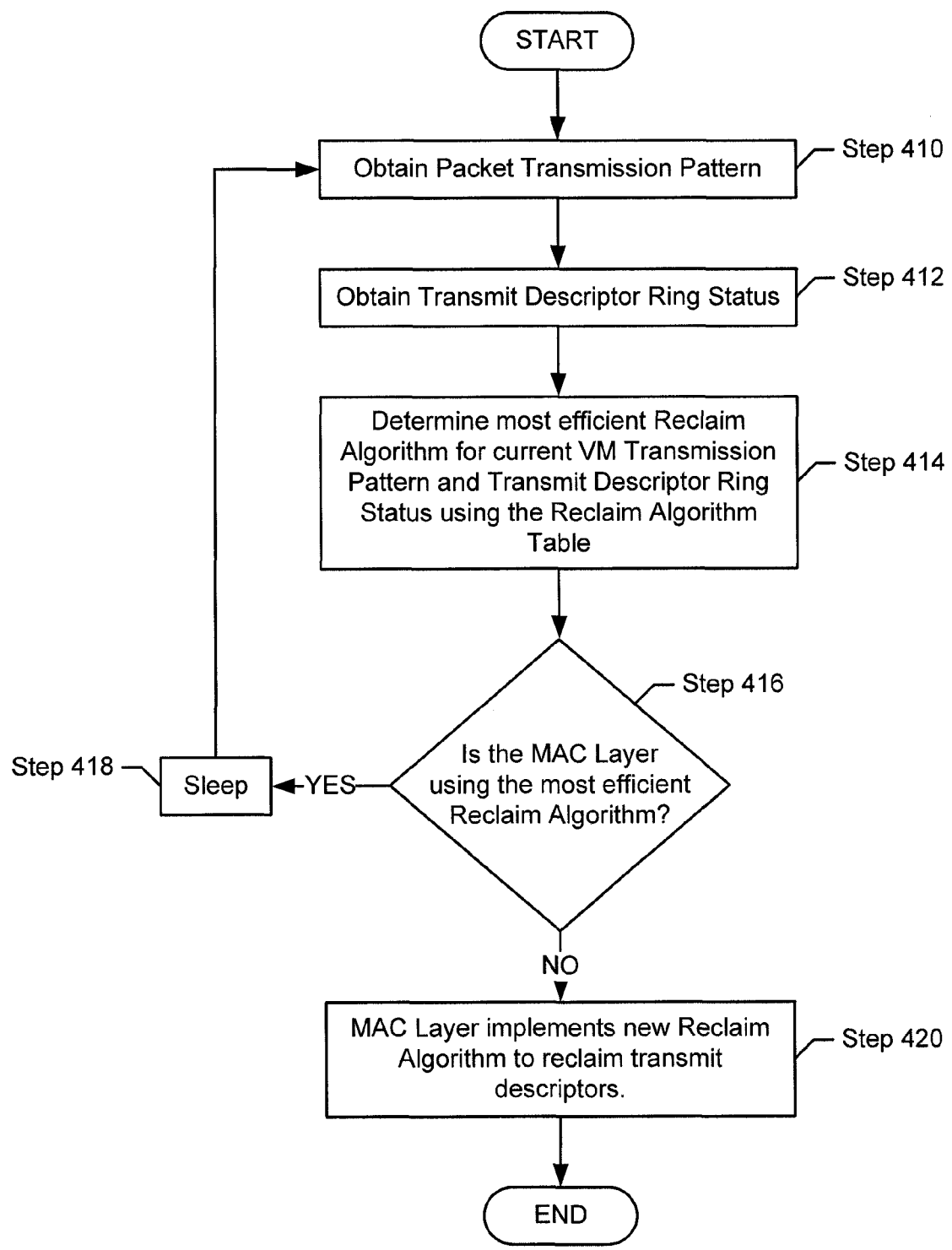
FIG. 4 shows a flowchart in accordance with one or more embodiments of the invention.

FIG. 4 shows a flow chart for initializing a virtual network stack in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 410, the MAC layer determines a packet transmission pattern. In Step 412, the MAC layer obtains a transmit descriptor ring status from the device driver. In Step 414, the MAC layer determines the most efficient reclaim algorithm for the transmission pattern and the transmit descriptor ring status using the reclaim algorithm table. In Step 416, the MAC layer compares the results from the reclaim algorithm table to the currently implemented reclaim algorithm. If the currently implemented reclaim algorithm is the most efficient (relative to other possible reclaim algorithms that may be used) then in Step 418, the system sleeps for a set amount of time, or until a triggering event occurs, and restarts at Step 410. If the currently implemented reclaim algorithm is not the most efficient, then in Step 420, the MAC layer implements the new reclaim algorithm to reclaim the transmit descriptors. Those skilled in the art will appreciate that in some cases even though the currently implemented reclaim algorithm is not the most efficient reclaim algorithm (based on the transmission pattern and the transmit descriptor ring status), the currently implemented reclaim algorithm may not be changed to a more efficient reclaim algorithm if the difference between the currently implemented reclaim algorithm and the more efficient reclaim algorithm is within a threshold range. Said another way, if the difference in performance between the two reclaim algorithms is not substantially different to justify the overhead required to change the reclaim algorithms, where the determination of whether the difference between the two reclaim algorithms is not substantially different is set by a user, the administrator, by default, determined using a heuristic or any combination thereof.

Figure 5A:
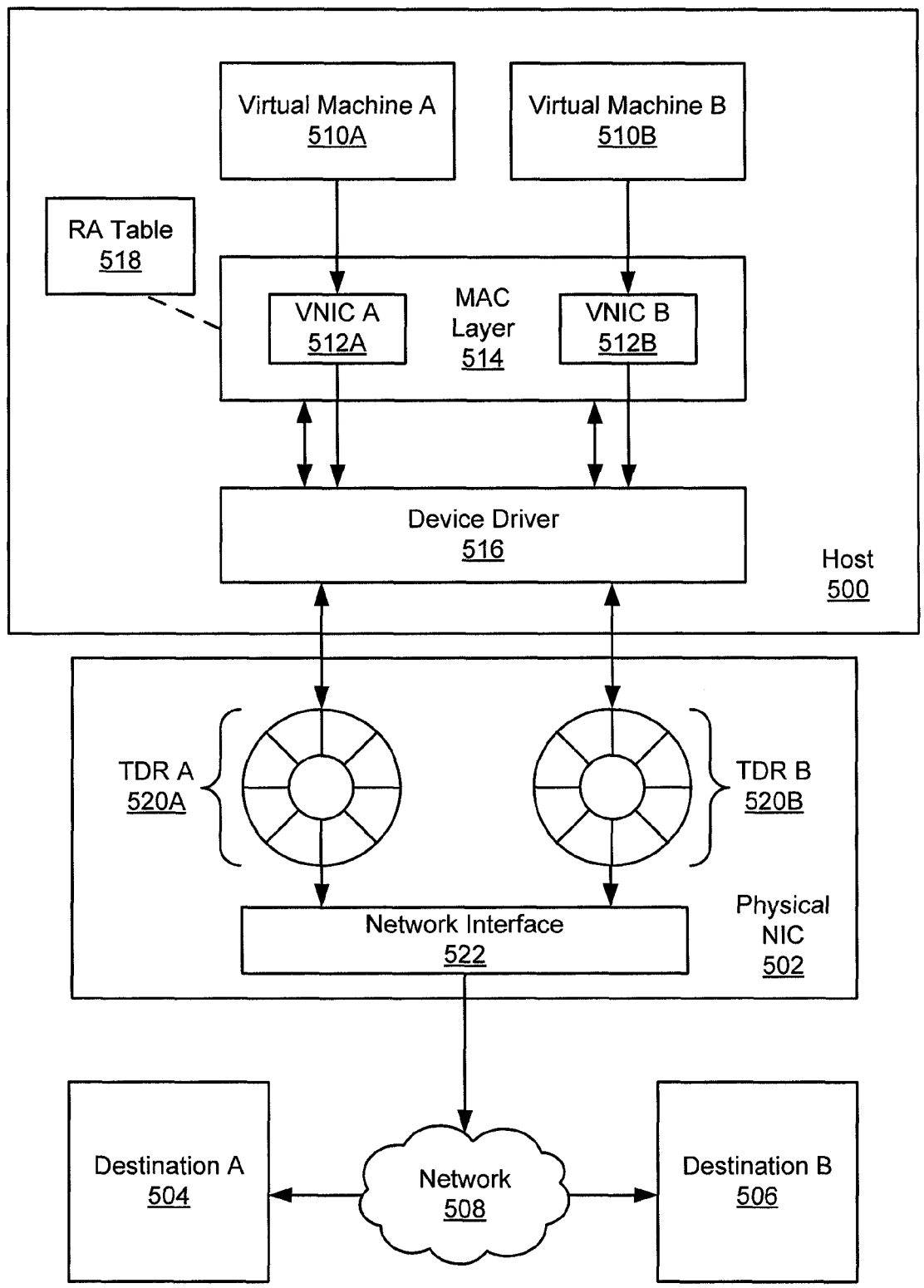
FIG. 5A shows an example in accordance with one or more embodiments of the invention.
Figure 5B:
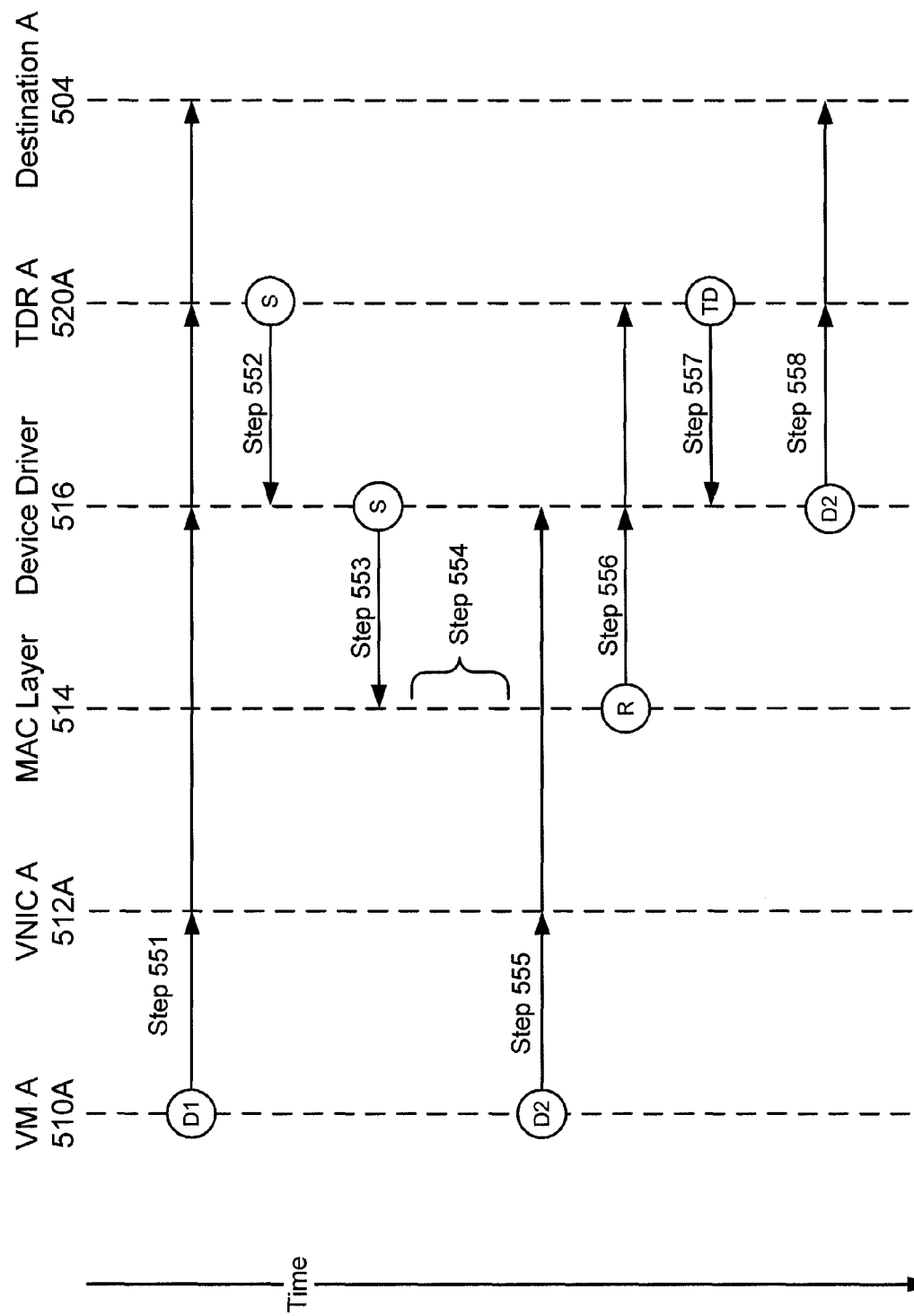
FIG. 5B shows an example in accordance with one or more embodiments of the invention.

FIGS. 5A and 5B show an exemplary configuration and timeline, respectively, in accordance with one embodiment of the invention. The exemplary system is not intended to limit the scope of the invention. Further, some elements unnecessary for the purposes of the exemplary figure may have been omitted.

As depicted in FIG. 5A, the exemplary configuration includes a host (500) operatively connected to a physical NIC (502). The physical NIC (502) configured to transmit packets to destination A (504) and destination B (506) via the network (508). The host includes two VMs (VM A (510A), VM B (510B)), two VNICs (VNIC A (512A), VNIC B (512B)) within a MAC layer (514), and a device driver (516). The MAC layer also includes an RA table (518). The physical NIC (502) includes two TDRs (TDR A (520A), TDR B (520B)) and a network interface (522).

As depicted in the exemplary timeline depicted in FIG. 5B, in Step 551, a packet (P1) or group of packets, are sent from VM A (510A) to VNIC A (512A). VNIC A transmits the packet to the device driver (516), where the packet is forwarded to TDR A (520A) before being transmitted across the network via the network interface to destination A (504). The packets received by VNIC A (512A) may be used, in part, to determine a transmission patter for VM A (510A).

In Step 552, the device driver (516) receives the TDR status from TDR A (520A). The TDR status is forwarded to the MAC layer (514) in Step 553. In Step 554, the MAC layer (514) uses the TDR status and the transmission pattern obtained from VNIC A (512A) to determine the most efficient reclaim algorithm. For the purposes of the example, assume that the MAC layer (514) has determined that an inline reclaim before transmission is the most efficient algorithm. The inline reclaim before transmission reclaim algorithm is subsequently used to for reclaiming TDs.

Continuing with the discussion of exemplary FIG. 5B, a second packet (P2) or set of packets is sent from VM A (510A) to VNIC A (512A), and forwarded to the device driver (516) in Step 555. In Step 556, the MAC layer (514) attempts to reclaim TDs according to the new reclaim algorithm (i.e., inline reclaim before transmission). Accordingly, the MAC layer (514) attempts to reclaim just enough TDs necessary to transmit the second packet (P2). In Step 557, the TDs are reclaimed, and in Step 558, the second packet (P2) is forwarded from the device driver (516) to TDR A (520A), where it is transmitted across the network to destination A (504).

Figure 6:
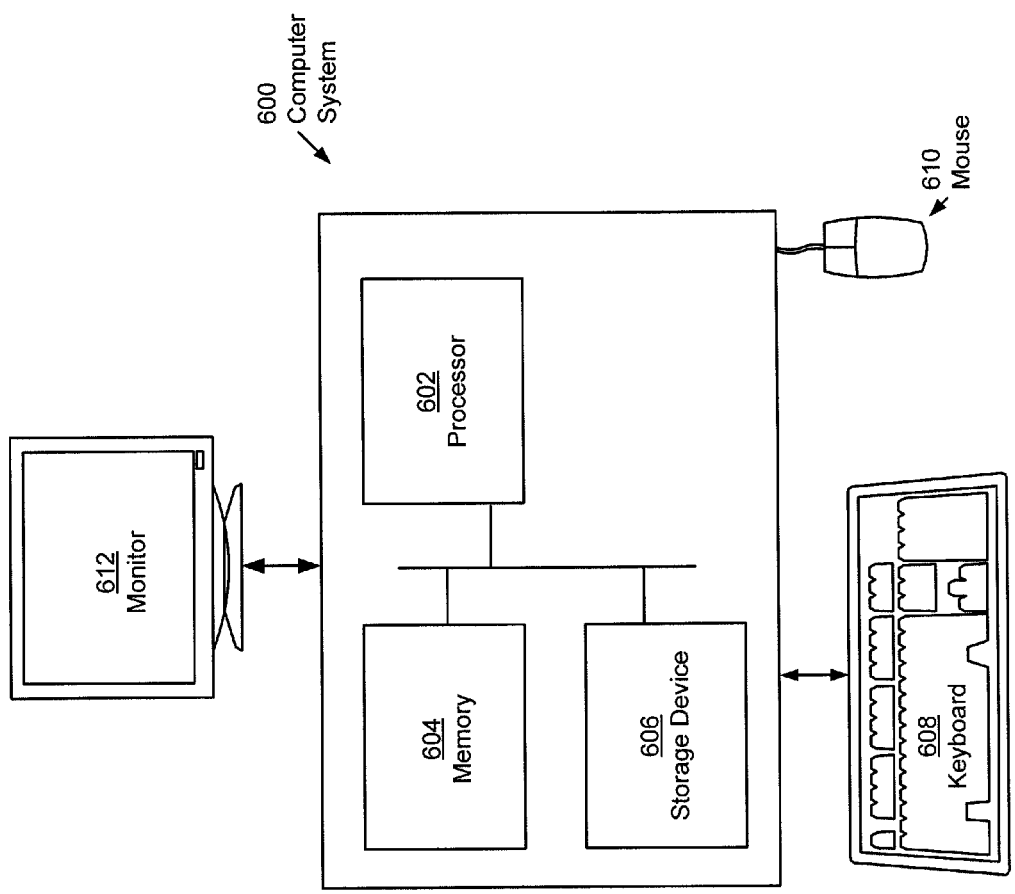
FIG. 6 shows a computer system in accordance with one or more embodiments of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions for reclaiming transmit descriptors, wherein the software instructions, when executed, perform a method, the method comprising:
configuring a media access control (MAC) layer to execute a first MAC layer thread to reclaim a first plurality of transmit descriptors (TDs) from a hardware transmit ring (HTR) using a first reclaim algorithm, wherein the HTR comprises a transmit descriptor ring (TDR) and resides on a physical network interface card (NIC), wherein the first MAC layer thread is executing on a host operatively connected to the physical NIC, and wherein the first reclaim algorithm is associated with a first transmission pattern and a first TDR status;
receiving, by a virtual NIC (VNIC) executing within the MAC layer, a first plurality of packets;
forwarding the first plurality of packets to a device driver on the host associated with the physical NIC;
forwarding the first plurality of packets from the device driver to the physical NIC using the first plurality of TDs, wherein the first plurality of TDs are reclaimed by the first MAC layer thread according to the first reclaim algorithm;
obtaining, by the first MAC layer thread, a second transmission pattern associated with the first plurality of packets;
obtaining, by the first MAC layer thread, a second TDR status from the device driver;
determining, by the MAC layer, that the second transmission pattern and the second TDR status are associated with a second reclaim algorithm; and
forwarding a second plurality of packets from the device driver to the physical NIC using a second plurality of TDs, wherein the second plurality of TDs are reclaimed according to the second reclaim algorithm,
wherein the second reclaim algorithm is implemented by a worker thread using computer resources associated with a source of the second plurality of packets.

2. The computer readable medium of claim 1, wherein the first reclaim algorithm is one selected from a group consisting of an inline reclaim after transmit and an inline reclaim before transmit, and a worker thread based reclaim.

3. The computer readable medium of claim 1, wherein the first MAC layer thread queries a table with a plurality of transmission patterns and a plurality of TDR statuses, wherein a combination of one of the plurality of transmission patterns and one of the plurality of transmit ring statuses is used to determine at least one reclaim algorithm.

4. The computer readable medium of claim 1, wherein the first MAC layer thread determines the first transmission pattern using a rate at which packets are being received by the VNIC.

5. The computer readable medium of claim 1, wherein the first transmission pattern is one selected from a group consisting of high throughput traffic and high latency traffic.

6. The computer readable medium of claim 1, wherein the VNIC is one of a plurality of VNICs executing on the host.

7. The computer readable medium of claim 1, wherein the physical NIC comprises a second HTR, wherein a second MAC layer thread reclaims at least one TD from the second HTR using a third reclaim algorithm.

8. The computer readable medium of claim 1, wherein the first plurality of packets is sent to the VNIC from one selected from a group consisting of a virtual machine and a virtual network stack.

9. A system comprising:
a physical network interface card (NIC) comprising a hardware transmit ring (HTR), wherein the HTR is one of a plurality of HTRs on the NIC, and wherein the HTR comprises a transmit descriptor ring (TDR); and
a host, operatively connected to the physical NIC, comprising a host operating system (OS), wherein the host OS comprises:
a device driver associated with the physical NIC;
a virtual NIC (VNIC), executing within a media access control (MAC) layer, configured to receive a first plurality of packets, wherein the VNIC is one of a plurality of VNICs executing within the MAC layer; and
the MAC layer configured to:
reclaim a first plurality of transmit descriptors (TDs) from the HTR using a first reclaim algorithm, wherein the first reclaim algorithm is associated with a first transmission pattern and a first TDR status;
forward the first plurality of packets to the physical NIC using the first plurality of TDs;
obtain a second transmission pattern associated with the first plurality of packets;
obtain a second TDR status from the device driver;
determine that the second transmission pattern and the second TDR status are associated with a second reclaim algorithm;
forward a second plurality of packets to the physical NIC using a second plurality of TDs,
wherein the second plurality of TDs are reclaimed according to the second reclaim algorithm,
wherein the second reclaim algorithm is implemented by a worker thread using computer resources associated with a source of the second plurality of packets.

10. The system of claim 9, wherein the first reclaim algorithm is one selected from a group consisting of an inline reclaim after transmit and an inline reclaim before transmit, and a worker thread based reclaim.

11. The system of claim 9, wherein the host OS further comprises a table with a plurality of transmission patterns and a plurality of TDR statuses, wherein a combination of one of the plurality of transmission patterns and one of the plurality of transmit ring statuses is used to determine at least one reclaim algorithm.

12. The system of claim 9, wherein the MAC layer is further configured to determine the first transmission pattern using a rate at which packets are being received by the VNIC.

13. The system of claim 9, wherein the first transmission pattern is one selected from a group consisting of high throughput traffic and high latency traffic.

14. The system of claim 9, wherein the MAC layer is further configured to execute a MAC layer thread configured to reclaim a third plurality of TDs from a second one of the plurality of HTRs according to a third reclaim algorithm.